UNITED STATES PATENT OFFICE.

HENRY NOEL POTTER, OF NEW ROCHELLE, NEW YORK, ASSIGNOR TO GEORGE WESTINGHOUSE, OF PITTSBURG, PENNSYLVANIA.

METHOD OF MAKING REFRACTORY BRICK.

No. 829,427.   Specification of Letters Patent.   Patented Aug. 28, 1906.

Application filed August 6, 1903. Serial No. 168,453.

*To all whom it may concern:*

Be it known that I, HENRY NOEL POTTER, a citizen of the United States, and a resident of New Rochelle, in the county of Westchester and State of New York, have invented certain new and useful Improvements in Methods of Making Refractory Brick, of which the following is a specification.

The object of my present invention is to produce a highly refractory basic or acid brick from materials of reasonable cost.

The most refractory material answering these requirements for basic brick is doubtless magnesium oxid. This material, however, as is well known, becomes progressively denser as it is heated to higher and higher temperatures, reaching its maximum density only when fused. For this reason it has been impossible hitherto to produce a brick of this material which would not crack when subjected to uneven heating. For example, it has been found that when an attempt is made to produce a brick from the light impalpable powder known as "light magnesia" it has no binding power and cracks to pieces when an attempt is made to fire it. If the fired material is ground and made into brick, it will also crack up as soon as it is again fired. If, however, the material is first melted and then ground and formed and heated short of fusion, I have found that a brick can be produced through the creation of crystals of magnesia. This action is due to the fact that magnesia sublimes below its melting-point. By causing some of the magnesia to sublime in this manner I find it possible to get the magnesia into an extremely strong state, and I find also that it does not shrink appreciably even when heated hot enough to give a distinctly crystalline fracture.

An acid brick of a highly refractory nature may be made by a similar process from fused silica. I have discovered, for example, that if fused silica be ground to a powder this powder may be pressed into brick, which is very fragile if no binder is added, but which may be made strong enough to handle by the addition of two per cent. or more of binding material, such as starch or tragacanth, which subsequently burns out, leaving the pure amorphous silica. If now this brick of powdered vitrified silica be heated hot enough to cause some of the silica to sublime slightly, just short of fusion, the brick particles will bind together and form a refractory structure.

The brick thus formed may be glazed on one or more sides by fusing the surface. Bricks of this character have the quality of not cracking when subjected to sudden changes of temperature or to greater temperature on one side than on the other, and are therefore well adapted to use in all places where acid brick is applicable.

While I have spoken of brick in the foregoing specification, I wish it to be understood as referring to any structure in which highly refractory bodies are useful either singly or in combination with others of like form. For example, the term should be understood broadly enough to include a crucible wherein substances including the crucible itself are liable to be subjected to considerable heat.

I claim as my invention—

1. The method of producing ceramic brick, which consists in fusing refractory material, cooling, comminuting, forming and submitting it to a temperature high enough to cause it to partially sublime.

2. The method of producing ceramic brick, which consists in fusing refractory material, cooling, comminuting, forming to the desired shape with the help of a transient binder, and submitting it to a temperature high enough to cause it to partially sublime.

3. The method of producing refractory brick which consists in shrinking the refractory material from which the brick is to be formed, grinding the shrunk material to a powder, pressing the powder into shape, and heating the shaped material until a portion thereof sublimes without fusing.

4. The process of making magnesia brick, which consists in vitrifying magnesia, reducing the vitrified material to powder, pressing it into form, and subjecting it to a temperature high enough to cause some of the magnesia to sublime.

Signed at New York, in the county of New York and State of New York, this 4th day of August, A. D. 1903.

HENRY NOEL POTTER.

Witnesses:
HERMAN SIEGEL,
WM. H. CAPEL.